UNITED STATES PATENT OFFICE.

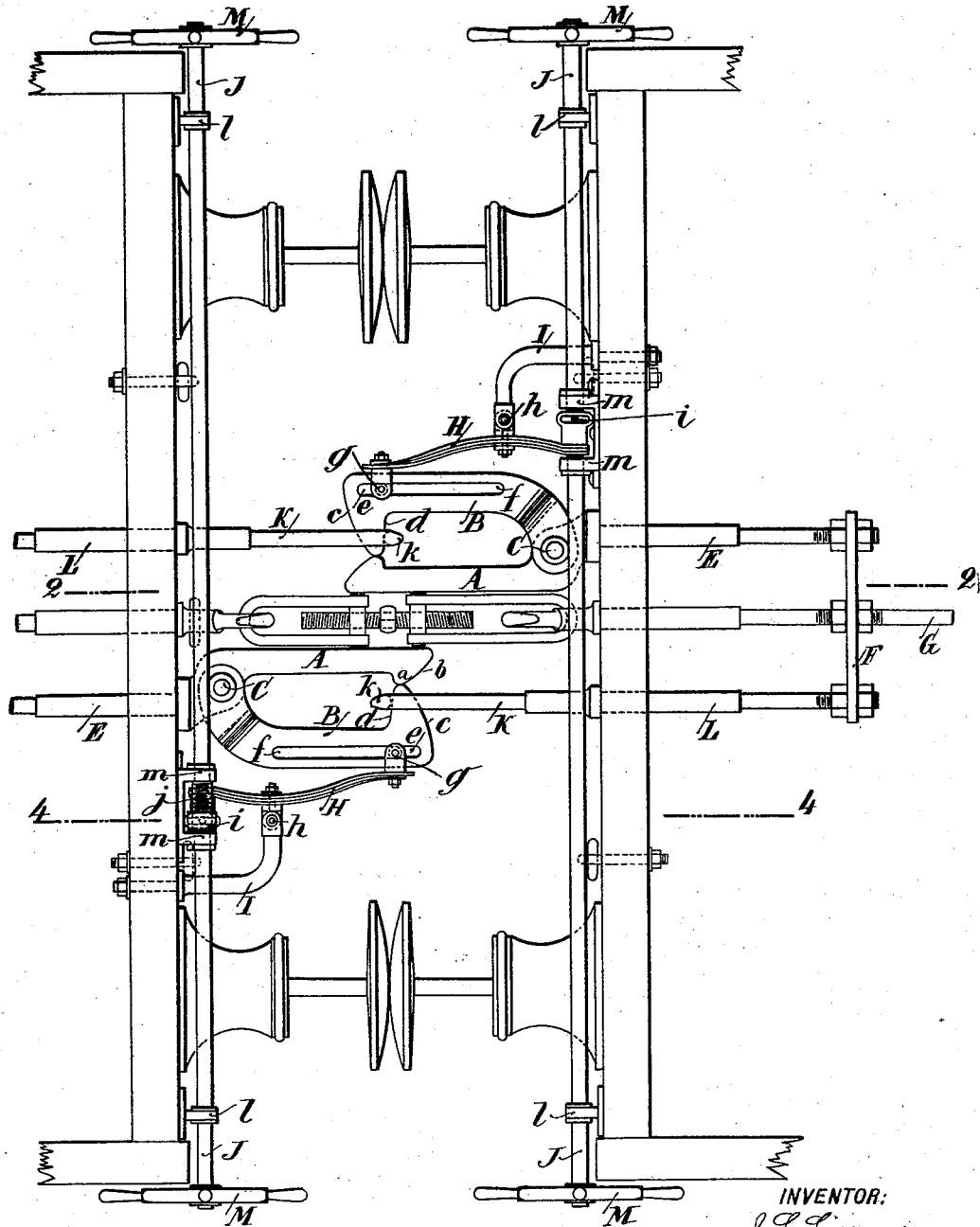

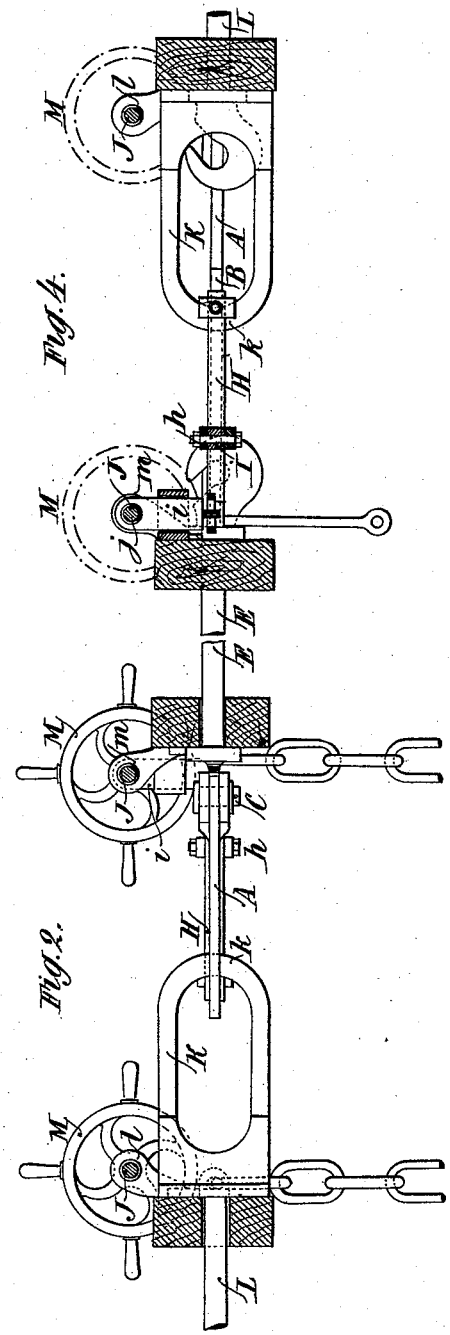

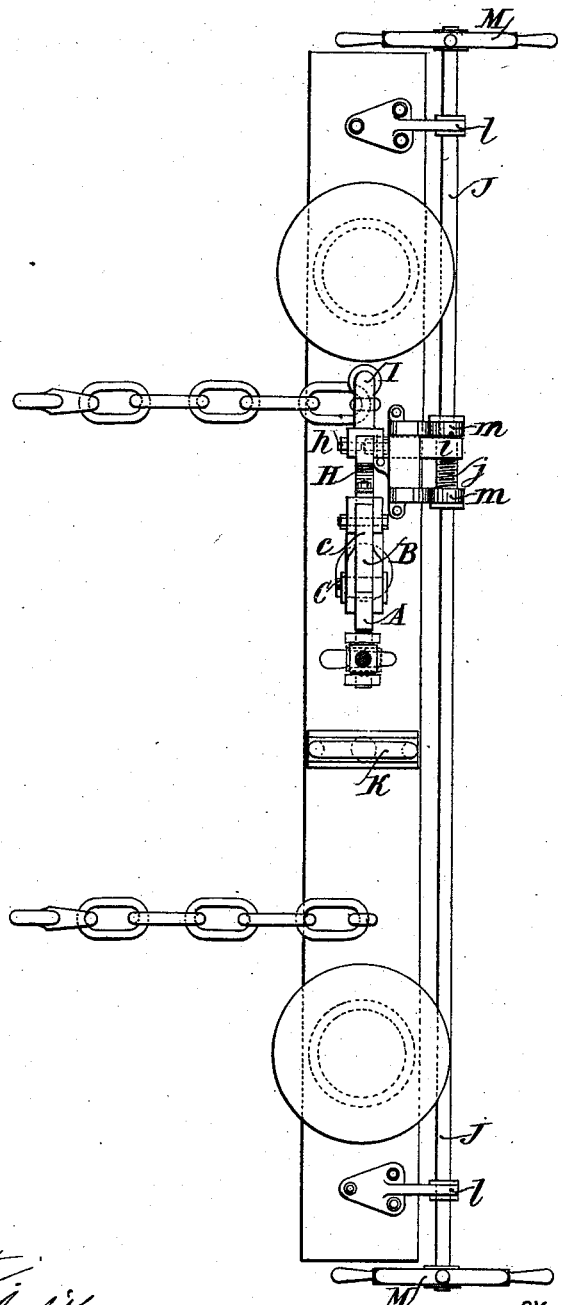

JOSEPH LOUIS LINOU, OF NARBONNE, FRANCE.

CAR-COUPLING.

SPECIFICATION forming part of Letters Patent No. 567,485, dated September 8, 1896.

Application filed May 14, 1896. Serial No. 591,573. (No model.)

*To all whom it may concern:*

Be it known that I, JOSEPH LOUIS LINOU, a citizen of the Republic of France, residing in Narbonne, (Aude,) France, have invented certain Improvements in Automatic Couplings for Railway-Carriages and the Like, of which the following is a specification.

My invention relates to improvements in automatic couplings for railway-carriages and the like, and has for its object to provide a coupling which avoids the objections which apply to those hitherto used.

In the accompanying drawings, Figure 1 shows in plan the adjacent end portions of two vehicles connected by couplings constructed according to my invention. Fig. 2 is a vertical section of the same, taken on the line 2 2, Fig. 1. Fig. 3 is an end view of one of the vehicles; and Fig. 4 is a vertical section taken through the line 4 4, Fig. 1.

The coupling apparatus is attached to each end of the vehicle and comprises a spring-jaw placed horizontally on one side and a shackle placed vertically on the other side of the ordinary coupling, which may be retained, so that when two vehicles come together the shackles are always opposite the corresponding jaws, no matter which end of the vehicle be presented to the adjacent vehicle. Duplicate couplings are thus obtained, but as these are identical only one pair will be described.

The jaws of the coupling are formed of a fixed part A and a movable part B, mounted on a hinge at C and controlled by a spring H. The said fixed part A is made fast with a rod E, connected by a cross-piece F with the ordinary draw-bar G of the vehicle and is formed at its front end with an inclined plane $b$ and a hook or catch $a$. The movable part B of the jaw is hinged at C eccentrically to the axis of the aforesaid rod E and is formed at its forward end with an inclined plane $c$ and a hook or catch $d$, the internal surface of which forms the arc of a circle described with the axis of the hinge C for the center. In the said movable part B a slot $e f$ is formed, which receives a roller $g$ mounted at the end of the spring H, which keeps the said movable part pressed against the fixed part of the jaw. The said spring H, which may be formed of superposed laminated blades, is attached at a point $h$ to a support I fixed to the end of the vehicle, the tail end of the said spring being connected to a nut $i$ mounted on a screw-threaded part $j$ of a rod J, hereinafter described. There is thus great freedom of movement in a longitudinal direction between the said spring H and the movable part B by reason of the aforesaid slot $e f$, which permits the said jaw to be freely displaced forwardly or rearwardly although connected to the said spring, which latter tends to keep the jaw in a closed position, or the spring may be employed as a lever for opening the jaw, as hereinafter described.

The shackle K is formed of an elongated ring fast on a rod L connected with the aforesaid cross-piece F of the draw-bar G of the vehicle. The front part $k$ of this ring is formed with a tapering cross-section to facilitate its entrance along the inclined plane $c$ between the jaws opposite to which it comes, the axis of the said shackle preferably being made to correspond with that of the jaws for this purpose.

The rod J, on which the screw-nut passes, is mounted in bearings $l$ on the end of the vehicle, so as to be parallel therewith, and is provided at each end beyond the buffers with a hand-wheel M. The said rod is screw-threaded at one part $j$ of its length, along which the nut $i$, connected to the tail end of the spring H, can be moved between two fixed stops $m$.

By turning the rod J the screw-nut $i$ is displaced and the spring is caused to turn on its point of attachment $h$, and causes the movable part B of the jaw to turn on its hinge C for either opening or closing the same. In order to connect together two carriages provided with these couplings, the movable parts of the jaws are first brought into a closed position against the fixed parts by turning the hand-wheels M from either side of the carriage, and then the vehicles are brought together. The shackles K strike on the inclined planes of the movable parts of the jaws, force the latter to open against the action of the springs H and engage therein, and then the movable parts B, under the actions of their springs H, at once resume contact with the fixed parts A, so that the jaws are closed and retain the shackles within them.

To detach the vehicles, the hand-wheels are again operated on so as to cause the nuts to be displaced and the springs H to turn in the reverse direction, and with them the movable parts B, so that the jaws are opened and the shackles can be withdrawn.

When passing over curves, the shackles K slide against the internal surfaces of the jaws.

The shackles should be of such a depth as to allow of a certain amount of variation in the height of the carriages, while still securing efficient coupling.

I claim—

1. Automatic couplings for railway-carriages and the like consisting of jaws one of which is fixed and the other hinged eccentrically on the first jaw a spring connected to the movable jaw and arranged to act thereon so as to close it onto the fixed one and to serve as a lever for opening the movable jaw, means for causing the rocking of the said spring and consequently the opening of the said jaw and a shackle or elongated ring disposed vertically the said jaws being placed horizontally, the said jaws and the shackle mounted on the draw-bar of a vehicle and being respectively presented opposite to the shackle and jaws of the mating coupling so as to become engaged and to form efficient couplings substantially as hereinbefore described.

2. A coupling, having a pivoted jaw, a spring engaging said jaws, and means for shifting the spring to open the jaw, substantially as described.

3. In a coupling, coupling-jaws one of which is pivoted, a pivoted spring bearing against said jaw and positively engaging the same, and means for rocking the spring on its pivot, substantially as described.

4. In a coupling, the combination of a pivoted jaw, a shaft having a threaded portion, and a pivoted spring engaging the threaded part of the shaft by a threaded connection, and also engaging the pivoted jaw, substantially as described.

5. In an automatic car-coupling, the combination with a fixed jaw, of a pivoted jaw having a hook-shaped end engaging the fixed jaw, a rotary and threaded shaft, a nut on said shaft, and a spring pivoted between its ends and having one end slidably connected with the pivoted jaw, and its other end with the said nut, substantially as described.

6. In an automatic car-coupling, the combination with a fixed jaw, of a pivoted jaw having a hook-shaped end engaging the fixed jaw, and provided with a longitudinal slot, a rotary shaft having a threaded portion, a nut on the shaft and a pivoted spring having one end secured to the said nut and its other end provided with a roller working in the slot of the movable jaw, substantially as described.

7. In an automatic coupling, the combination with a draw-bar provided with a cross-bar, of a rod secured to one end of the cross-bar, a fixed jaw rigid with the rod, a movable jaw pivoted to the rod, a pivoted spring having one end engaging the pivoted jaw, means for swinging the spring on its pivot, and a rod secured to the other end of the cross-bar and provided with an eye at its end for engaging the opposing coupling-jaw, substantially as herein shown and described.

In testimony whereof I have signed my name to this specification in the presence of two subscribing witnesses.

JOSEPH LOUIS LINOU.

Witnesses:
PIERRE MARIE FLOUEVALL,
BERTRAND CAMPARDAN.